| United States Patent [19] | [11] | 4,071,467 |
|---|---|---|
| Nordgren | [45] | Jan. 31, 1978 |

[54] SELF-COMPLEXING GALACTOMANNAN GUMS

[75] Inventor: Robert Nordgren, Minneapolis, Minn.

[73] Assignee: General Mills Chemicals, Inc., Minneapolis, Minn.

[21] Appl. No.: 737,814

[22] Filed: Nov. 1, 1976

[51] Int. Cl.² ............................................. B01J 13/00
[52] U.S. Cl. ..................................... 252/316; 149/44; 149/60; 149/19.1

[58] Field of Search ................... 149/77, 44, 60, 19.1; 252/316

[56] References Cited

U.S. PATENT DOCUMENTS 3,485,686  12/1969  Jessop et al. ...................... 149/77 X Primary Examiner—Stephen J. Lechert, Jr.
Attorney, Agent, or Firm—Elizabeth Tweedy; Patrick J. Span

[57] ABSTRACT

Self-complexing galactomannan gum blends which exhibit delayed gelling at acidic pH levels.

3 Claims, No Drawings

SELF-COMPLEXING GALACTOMANNAN GUMS

This invention relates to self-complexing blends of galactomannan gums and cross-linking agents which exhibit delayed gelling. More particularly, this invention relates to blends of galactomannan gums, a salt of antimony in which the antimony has a valence of plus three and an oxidizing agent selected from alkali metal periodates and permanganates. These blends operate well in acidic pH ranges of about 1 to neutral 7. The blends are particularly useful in the manufacture of packaged, gelled explosive slurries containing aluminum metal sensitizers or in other applications where delayed gel formation is desired in media having acidic pH levels.

BACKGROUND OF INVENTION

A self-complexing gum blend is one that may be dissolved in an aqueous solution and then, after the gum portion is swollen, will complex or cross-link to form a water-resistant gel. Self-complexing blends are used in the explosive industry for making gelled explosive slurries. The blend is solvated in a saturated solution of ammonium nitrate and sodium nitrate in water. Once the blend is solvated, other ingredients, such an ammonium nitrate prills and aluminum metal, are usually added. At this point, the product is a viscous explosive slurry which is usually packaged in plastic bags. After packaging, the gum is cross-linked to form a water-resistant gel. The gel must form on standing overnight (about 16 hours). The gelled explosive slurry can then be used as an explosive in places where water is present.

It is known that antimony salts in which the antimony has a valence of plus three will cross-link guar gum at alkaline pH values. Alkaline pH values, however, desensitize aluminum metal. Therefore, this type of cross-linking is inappropriate for explosive slurries containing aluminum metal as a sensitizer.

It is also known that trivalent antimony salts, when oxidized with strong oxidizing agents, such as sodium dichromate, will immediately cross-link galactomannan solutions such as guar in acidic solutions, the cross-linking agent being antimony having a plus five valence. In this blend, however, a stiff water-resistant gel is formed in less than five minutes. The rate of cross-linking is too rapid for this blend to be used in the manufacture of packaged, gelled explosive slurries. Other examples of strong oxidizing agents which produce rapid cross-linking with antimony are calcium and sodium hypochlorites. A large number of oxidizing agents have been tested and most have not oxidized antimony from a valence of plus three to plus five or have done so so slowly as to be useless in the practical sense for manufacturing such items as packaged, gelled explosive slurries. Among such oxidizing agents are potassium perchlorate, sodium chlorate, potassium bromate, potassium persulfate, lead dioxide, manganese dioxide, stannic chloride, cobalt oxide, ceric ammonium sulfate and manganese oxalate.

Currently, self-complexing blends used in manufacturing explosive slurries are guar gum blended with 1 to 4% by weight potassium pyroantimonates based upon the weight of the gum portion. Pyroantimonates dissolve slowly in water releasing antimony with a valence of plus five. The pentavalent antimony cross-links the galactomannan gum. There are two disadvantages involved in using potassium pyroantimonates. The first is that not all commercially produced pyroantimonates will cause cross-linking of the galactomannan gum. The second is that those brands of potassium pyroantimonate which do produce cross-linking do so too rapidly, namely less than 1 hour, for efficient manufacturing procedures.

SUMMARY OF INVENTION

The galactomman gum/cross-linking agent blends of the present invention provide controlled rates of cross-linking and gelling. The blends comprise a galactomannan gum, a trivalent antimony salt and an oxidizing agent selected from alkali metal periodates and permanganates. In the blends, antimony with a plus five valence is the cross-linking agent between the galactomannan molecules. If antimony with a plus five valence is present before the galactomannan is solvated, it will cross-link immediately with the galactomannan, thus preventing the galactomannan from completely swelling. In the present blend, the oxidizing agent slowly oxidizes the antimony from a valence of plus three to plus five over a period of time which allows solvation of the galactomannan, thickening of the slurry, and packaging of the slurry. Thereafter, the thickened, packaged slurry gels into a stiff mass that cannot be easily forced into a package.

The blends of this invention provide cross-linking at acidic pH levels. The preferred pH range for packaged, gelled explosive slurries is about 4 to 6. When the blend is not going to be used within a short period of time, the moisture of the blend should be below about 10% by weight of the gum to prevent interaction of the trivalent antimony ion and the oxidizing agent. If pentavalent antimony ion is produced it can cross-link the relatively dry galactomannan gum.

DETAILS OF INVENTION

In the blends of this invention, the preferred galactomannan gum is guar gum because it is soluble in nitrate solutions at room temperature and is readily available. Other galactomannan gums, such as locust bean flour, solvate in nitrate solutions only at temperatures above about 60° C. Therefore, the mixture must be heated when locust bean gum is used.

The cross-linking antimony salt useful in the blends of this invention may be any water-soluble antimony salt in which the valence of the antimony is plus three. Due to their availability, ease of handling, and ready solubility, potassium antimony tartrate and sodium antimony tartrate are generally preferred. Other water-soluble antimony salts, such as antimony lactate, antimony trifluoride, antimony sulfate, can be used although they are not as readily available as the preferred salts. The amount of antimony ion in the blend is preferably about 0.40 to 1.75% by weight, based upon the weight of the galactomannan. With this quantitive range of antimony, gels that vary from moderately soft to extremely stiff can be produced. For making most packaged, gelled slurries, about 0.60 to 1.20% antimony trivalent ion by weight of the galactomannan gum is preferred.

The oxidizing agent is selected from the alkali metal periodates and permanganates. Generally, stoichiometric amounts of the periodate or permanganate salt are used to oxidize the antimony ion having a valence of plus three to an antimony ion having a valence of plus five. Higher levels are unnecessary. Lower levels can be used but the degree of cross-linking will be determined by the amount of trivalent antimony oxidized to pentavalent antimony.

The blends can be prepared by dry-blending the constituents. A blend can be introduced into an explosive slurry by solvating it in a saturated aqueous solution of ammonium nitrate and sodium nitrate. Thereafter, the other ingredients of the explosive slurry, such as ammonium nitrate prills and aluminum, can be added. When the blend is to be used for purposes other than packaged, gelled explosive slurries, it can be solvated in an aqueous solution. After the gum portion has swollen and thickened the media, the mixture will cross-link to form a water-resistant gel.

The following specific example illustrates the benefits of the present invention. It is not intended, however, to, in any way, limit the scope of the invention.

EXAMPLE I

The following three blends were made by dry blending the constituents. All "parts" and "percentages" set out below are by weight:

Blend A 97.5 parts fine guar gum (80% through 200 mesh U.S. standard sieve)

2.0 parts potassium antimony tartrate (100% through 60 mesh U.S. standard sieve)

0.4 parts potassium permanganate (100% through 60 mesh U.S. standard seive)

Blend B 96.6 parts fine guar gum (80% through 200 mesh U.S. standard sieve)

2.0 parts potassium antimony tartrate (100% through 60 mesh U.S. standard sieve)

1.4 parts potassium periodate (100% through 60 mesh U.S. standard sieve)

Blend C 98.0 parts fine guar gum 2.0 parts potassium pyroantimonate (sold by the M. and T. Co.)

Three and one-half parts of these three blends were solvated in 320 parts of warm (50°–60° C) solution made up of 60% ammonium nitrate, 15% sodium nitrate and 25% water. After 4 to 9 minutes of mixing, additional ammonium nitrate prills in an amount of 131 parts based upon the weight of the solution and 90 parts of fine aluminum (sold by Alco, grade 1620G) based upon the weight of the solution were added and mixed for 1 minute. At this point, the slurries were very mobile and could be packaged in polyethylene bags. The slurries from Blends A and B remained mobile for 2 to 3 hours. Blend C slurries became immobile in less than an hour. After standing overnight, the gelled explosive slurries containing Blends A, B and C were tested for water resistance by covering with water. There appeared to be no changes after several days under water. This is a sufficiently long time to allow the mining operators to explode these gels.

Using the procedure of Example I, longer holding periods can be obtained by reducing the temperature of the nitrate liquor. At a temperature of about 25° C or below, the holding period was from about 4 to 5 hours for slurries containing Blends A and B and from about 1 to 2 hours for slurries containing Blend C. It should be noted that warm nitrate solutions are preferred for two reasons: first, more nitrates can be dissolved in the water; and second, the resulting explosive slurry is more mobile when warm and more easily handled.

The embodiments of the invention in which an exclusive property or privilege is claimed are defined as follows:

1. A self-complexing blend consisting essentially of galactomannan gum, a water-soluble antimony salt in which the antimony ion is trivalent in amounts of from about 0.40 to 1.75% by weight based upon the weight of the galactomannan, and an oxidizing agent selected from the alkali metal periodate and permanganate salts in sufficient amounts to oxidize the trivalent antimony ion to a pentavalent antimony ion upon solvation.

2. The composition of claim 1 wherein the moisture content is below about 10% by weight based upon the weight of the gum.

3. The composition of claim 1 wherein the antimony trivalent ion is present in an amount of about 0.60 to 1.20% weight of the galactomannan gum.

* * * * *